United States Patent
Oishi

(10) Patent No.: US 7,017,332 B2
(45) Date of Patent: Mar. 28, 2006

(54) LOBE MIXER FOR JET FLOW

(75) Inventor: Tsutomu Oishi, Hannou (JP)

(73) Assignee: Ishikawajima-Harima Heavy Industries Co., Ltd, Tokyo (JP)

( * ) Notice: Subject to any disclaimer, the term of this patent is extended or adjusted under 35 U.S.C. 154(b) by 0 days.

(21) Appl. No.: 10/358,171

(22) Filed: Feb. 5, 2003

(65) Prior Publication Data

US 2003/0145578 A1 Aug. 7, 2003

(30) Foreign Application Priority Data

Feb. 6, 2002 (JP) .............................. 2002-029001

(51) Int. Cl.
*F02K 1/46* (2006.01)
*F02K 3/02* (2006.01)

(52) U.S. Cl. .................................. 60/262; 239/265.17

(58) Field of Classification Search ................. 60/262; 181/220; 239/265.17
See application file for complete search history.

(56) References Cited

U.S. PATENT DOCUMENTS

| 3,048,676 A | 8/1962 | Howald et al. |
| 3,053,340 A | 9/1962 | Kutney |
| 3,065,818 A * | 11/1962 | Albert et al. ........... 239/265.17 |
| 4,117,671 A | 10/1978 | Neal et al. |
| 4,335,801 A | 6/1982 | Stachowiak et al. |
| 5,440,875 A * | 8/1995 | Torkelson et al. ..... 239/265.17 |
| 5,908,159 A * | 6/1999 | Rudolph ...................... 60/262 |
| 6,412,283 B1 | 7/2002 | Sheoran et al. |

FOREIGN PATENT DOCUMENTS

| EP | 0 635 632 | 1/1995 |
| GB | 885 713 | 12/1961 |

\* cited by examiner

Primary Examiner—Michael Koczo, Jr.
(74) Attorney, Agent, or Firm—Griffin & Szipl, P.C.

(57) ABSTRACT

There is disclosed a lobe mixer comprising: a cylindrical partition wall 22 which partitions a high-speed inner flow from a low-speed outer flow; a lobe portion 24 which is disposed on a downstream side of the partition wall and whose transverse sectional shape is a waveform shape and is enlarged on the downstream side; and a connecting reinforcement member 26 which is disposed between lobe side walls 24a extending in a radial direction of the lobe portion to connect the adjacent lobe side walls to each other. The connecting reinforcement member 26 is a thin member disposed along a flow line of a fluid which flows between the lobe side walls.

3 Claims, 7 Drawing Sheets

Vibration characteristics of top portion of lobe side wall

Vibration characteristics of middle portion of lobe side wall

LOBE MIXER FOR JET FLOW

BACKGROUND OF THE INVENTION

1. Technical Field of the Invention

The present invention relates to a lobe mixer for jet flow in which a high-speed inner flow and low-speed outer flow are mixed and exhausted.

2. Description of the Related Art

Examples of an apparatus, high speed flow and low speed flow are mixed inside thereof, is an airplane engine which includes an afterburner. As shown in FIG. 1, an airplane engine 1 (jet engine) equipped with the afterburner includes: a fan 2 which takes in air; a compressor 3 which compresses the taken air; a combustor 4 which burns fuel by the compressed air; a turbine 5 which drives the fan 2 and compressor 3 by combustion gas of the combustor 4; and an afterburner 6 which burns the fuel again to increase a thrust force.

The afterburner 6 is constituted of: a flame holder 7 (flame holding unit) which has a triangular section and forms a circulation region X downstream to hold flame; a fuel nozzle 8 for spouting the fuel; and an ignition plug 9, and spouts the exhaust gas via an exhaust nozzle 12 through a liner 11 disposed inside an outer duct 10 to increase the thrust force.

Moreover, the air taken in by the fan 2 is branched into a core flow 14 which flows through the compressor 3, combustor 4, and turbine 5, and a bypass flow 13 (fan flow) which bypasses these components, and the flows are combined in a mixer (mixing unit) 15. It is to be noted that reference numeral 16 denotes a tail cone.

As shown in FIG. 2, the mixer 15 includes a guide wall (partition wall) whose transverse sectional shape is a waveform shape, the waveform shape is enlarged downstream, the fan flow 13 (solid line) and core flow 14 (broken line) are combined in a downstream end, and the circulation region X is formed on the downstream side of the mixer 15 in order to efficiently mix the flows. The mixer structured in this manner is generally called a lobe mixer.

The lobe mixer shown in FIG. 2 is also used as a mixture promoting apparatus for a purpose of reducing exhaust jet noise of a turbofan engine which does not include the afterburner. In this case, the mixer is not only installed inside the engine but also exposed and installed as an exhaust nozzle outside the engine.

FIGS. 3A and 3B are diagrams showing a constitution of a conventional lobe mixer, FIG. 3A is a side view, and FIG. 3B is a sectional view in line III—III, showing a jet port of the lobe mixer. As shown in the drawing, the lobe mixer uses longitudinal eddy generated in an exit of the lobe mixer to promote mixture of a high-speed inner flow which passes inside the mixer with a low-speed outer flow which flows outside the mixer.

The above-described lobe mixer is one effective means for reducing the jet noise. However, in the lobe mixer, vibration (forced vibration and self-excited vibration) is easily generated by a pressure difference of inner and outer surfaces, and a vibration mode is generated involving high stress and displacement in a part of the lobe mixer. In a worst case, there is a possibility that the lobe mixer is cracked, and there has been a problem that it is difficult to establish both long life and noise reduction.

SUMMARY OF THE INVENTION

The present invention has been developed to solve the problem. That is, an object of the present invention is to provide a lobe mixer for jet flow which efficiently mixes a high-speed inner flow and low-speed outer flow and which does not easily cause vibration involving high stress and displacement and which can establish both long life and noise reduction.

According to the present invention, there is provided a lobe mixer for jet flow, comprising: a cylindrical partition wall (22) which partitions a high-speed inner flow from a low-speed outer flow; a lobe portion (24) which is disposed on a downstream side of the partition wall and whose transverse sectional shape is a waveform shape and whose waveform shape is enlarged on the downstream side; and a connecting reinforcement member (26) which is disposed between lobe side walls (24a) extending in a radial direction of the lobe portion to connect the adjacent lobe side walls to each other.

According to a preferred embodiment of the present invention, the connecting reinforcement member (26) is a thin member disposed along a flow line of a fluid which flows between the lobe side walls.

Moreover, the connecting reinforcement member (26) is preferably a semi-cylindrical member or U-shaped sectional member whose opposite ends are fixed to outer surfaces of the lobe side walls disposed adjacent to each other.

According to the constitution of the present invention, in the same manner as in the prior-art lobe mixer, the high-speed inner flow and low-speed outer flow are efficiently mixed by the cylindrical partition wall (22) and lobe portion (24), and noise reduction can be achieved.

Moreover, since the connecting reinforcement member (26) for connecting the adjacent lobe side walls to each other is disposed, the lobe side walls are inhibited from being deformed by a pressure difference of inner and outer surfaces, a vibration mode involving high stress and displacement is prevented from being generated, and long life can be realized.

Furthermore, since the connecting reinforcement member (26) is the thin member along the flow line of the fluid flowing between the lobe side walls, the flow flowing through the lobe portion (24) is not disturbed. A whistling sound which raises a problem in the noise reduction is prevented from being generated, and an original function can normally be fulfilled.

Additionally, the connecting reinforcement member (26) is the semi-cylindrical member or U-shaped sectional member whose opposite ends are fixed to the outer surfaces of the lobe side walls disposed adjacent to each other. Therefore, the member has flexibility in a peripheral direction, the flow line is not disturbed, natural vibration frequency of the lobe portion is increased, and vibration can be avoided.

Other objects and advantageous characteristics of the present invention will be apparent from the following description with reference to the accompanying drawings.

BRIEF DESCRIPTION OF THE DRAWINGS

FIG. 6D illustrates a second embodiment of the invention as viewed from a VIB—VIB sectional view of FIG. 5;

DESCRIPTION OF THE PREFERRED EMBODIMENT

Figure 1:
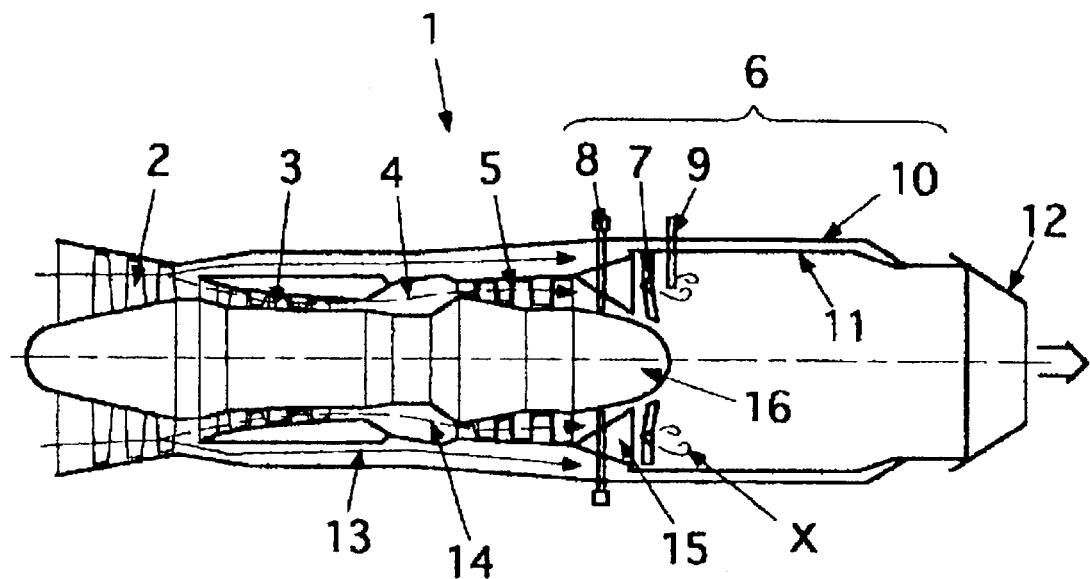
FIG. 1 is a constitution diagram of a jet engine which includes a prior-art mixer.
Figure 2:
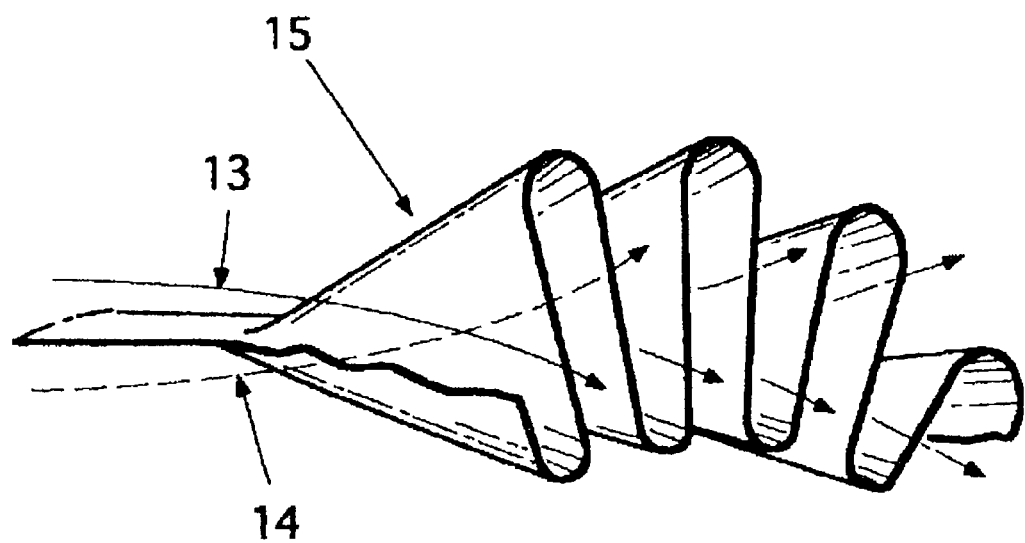
FIG. 2 is a partial perspective view of the prior-art mixer.
Figure 3A:
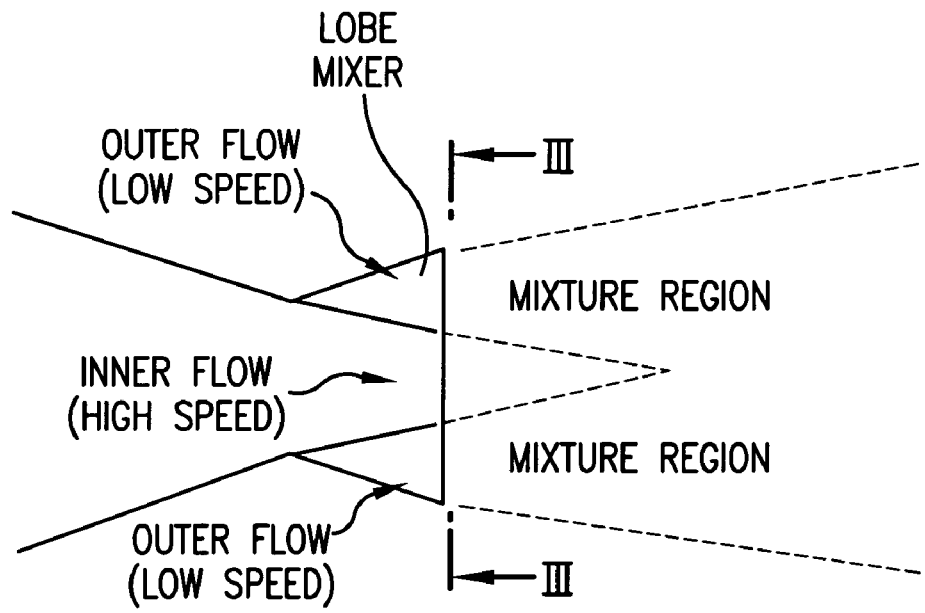
FIGS. 3A and 3B are constitution diagrams of a conventional lobe mixer.
Figure 3B:
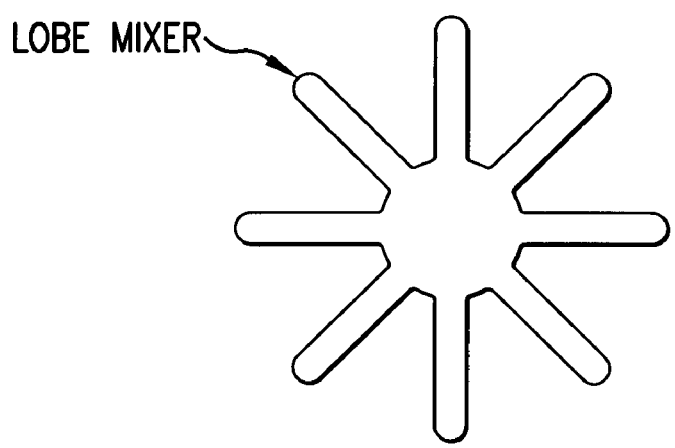

A preferred embodiment of the present invention will be described hereinafter with reference to the drawings. It is to be noted that common parts in the respective drawings are denoted with the same reference numerals, and redundant description is omitted.

Figure 4:
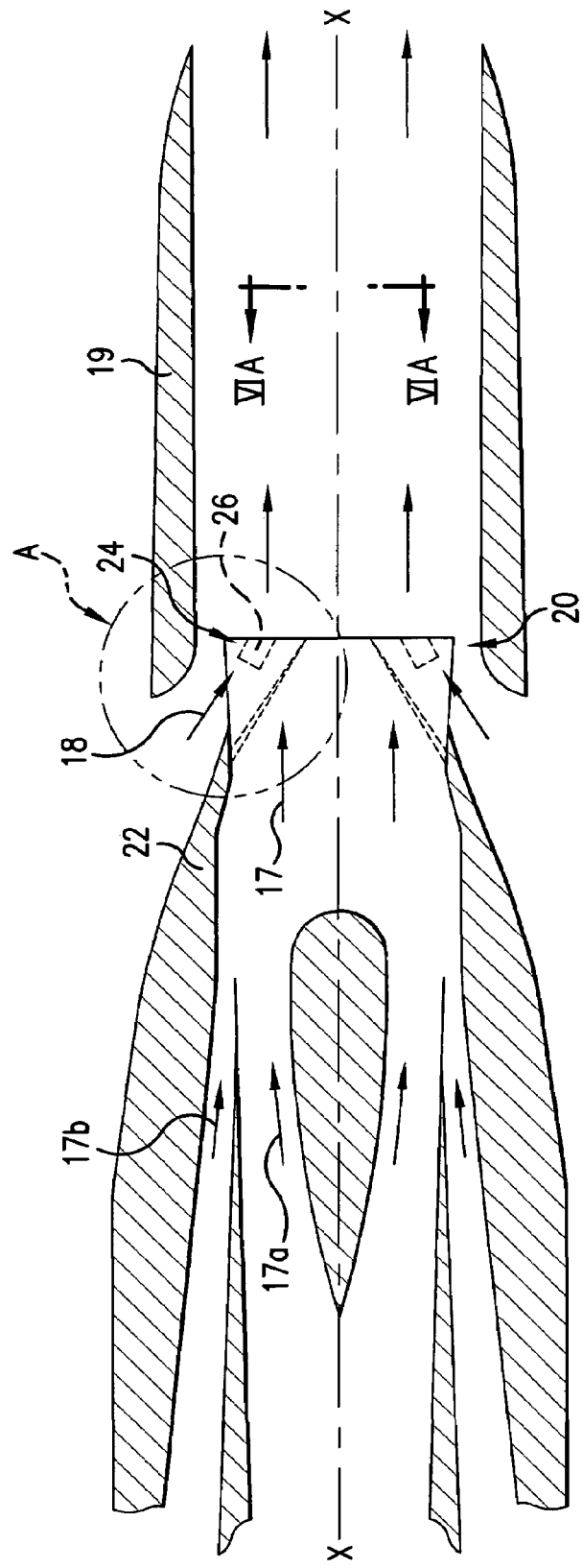
FIG. 4 is a whole constitution diagram of an exhaust nozzle for an airplane engine, which includes a lobe mixer for jet flow according to the present invention.

FIG. 4 is a whole constitution diagram of an exhaust nozzle for an airplane engine, which includes a lobe mixer for jet flow according to the present invention. As shown in the drawing, a lobe mixer for jet flow 20 according to the present invention includes a cylindrical partition wall 22, lobe portion 24, and connecting reinforcement member 26. It is to be noted that in the drawing, reference numeral 19 denotes an exhaust nozzle. FIG 4 shows that cylindrical partition wall 22 and lobe portion 24 are aligned along axial line X—X.

The cylindrical partition wall 22 is a partition wall which partitions a high-speed inner flow 17 from a low-speed outer flow 18. In this example, the high-speed inner flow 17 is a mixed flow of a core flow 17a which passes through a compressor, combustor, and turbine of a jet engine, and a bypass flow 17b, and the low-speed outer flow 18 is an outer air flow.

The lobe portion 24 is continuously disposed on a downstream side of the cylindrical partition wall 22. A transverse sectional shape (i.e., section crossing at right angles to axial line X—X) of the lobe portion 24 is a waveform shape, and the waveform shape has a largely shaped wave height on the downstream side.

Figure 5:
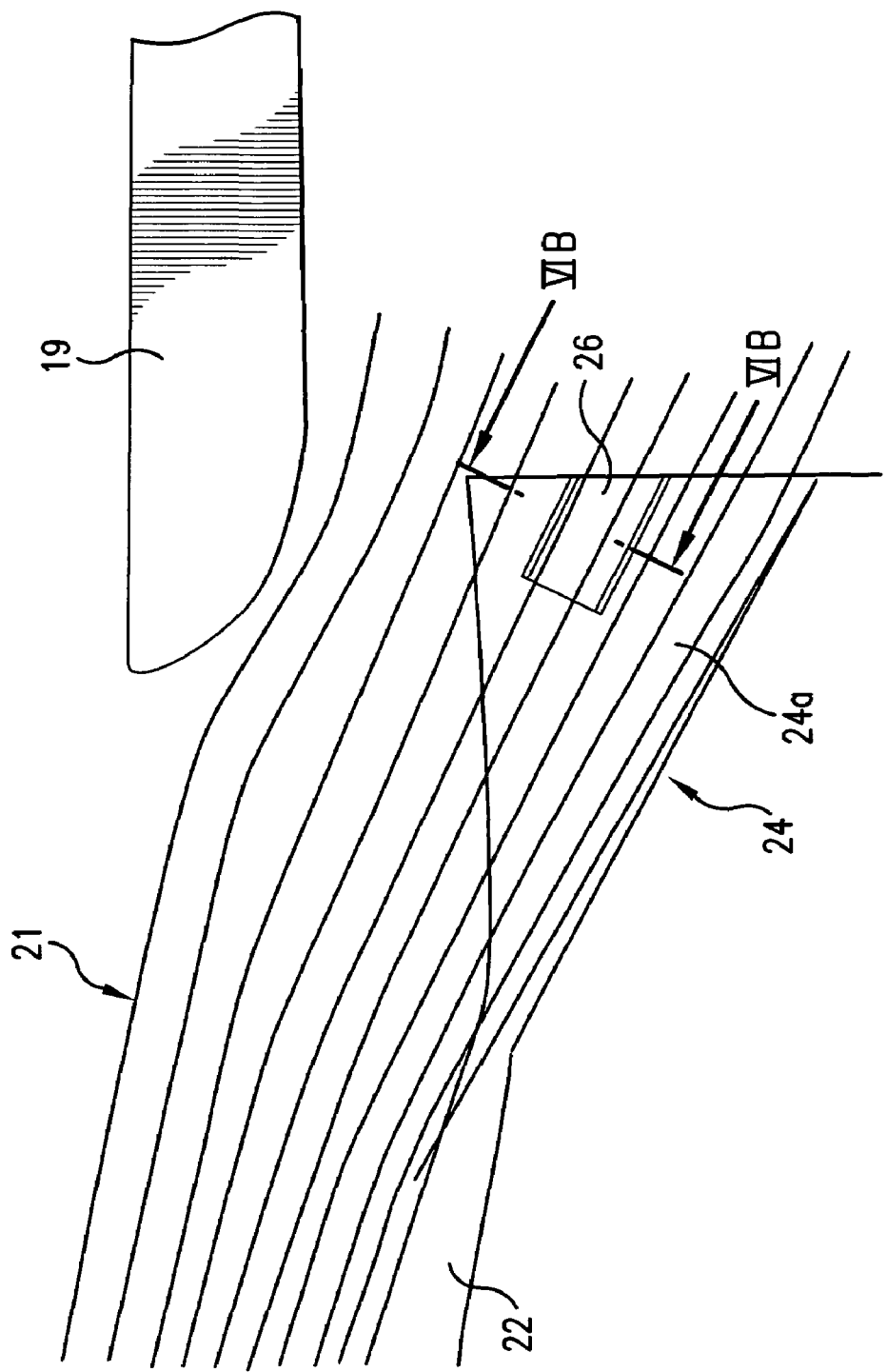
FIG. 5 is an A-part enlarged view of FIG. 4.

FIG. 5 is an A-part enlarged view of FIG. 4. In the drawing, the lobe portion 24 shows a lobe portion thereof, 24a shows an out side surface of the lobe portion 24, and flow lines of fluid (air flow) flowing through the portion are denoted with reference numeral 21.

Figure 6A:
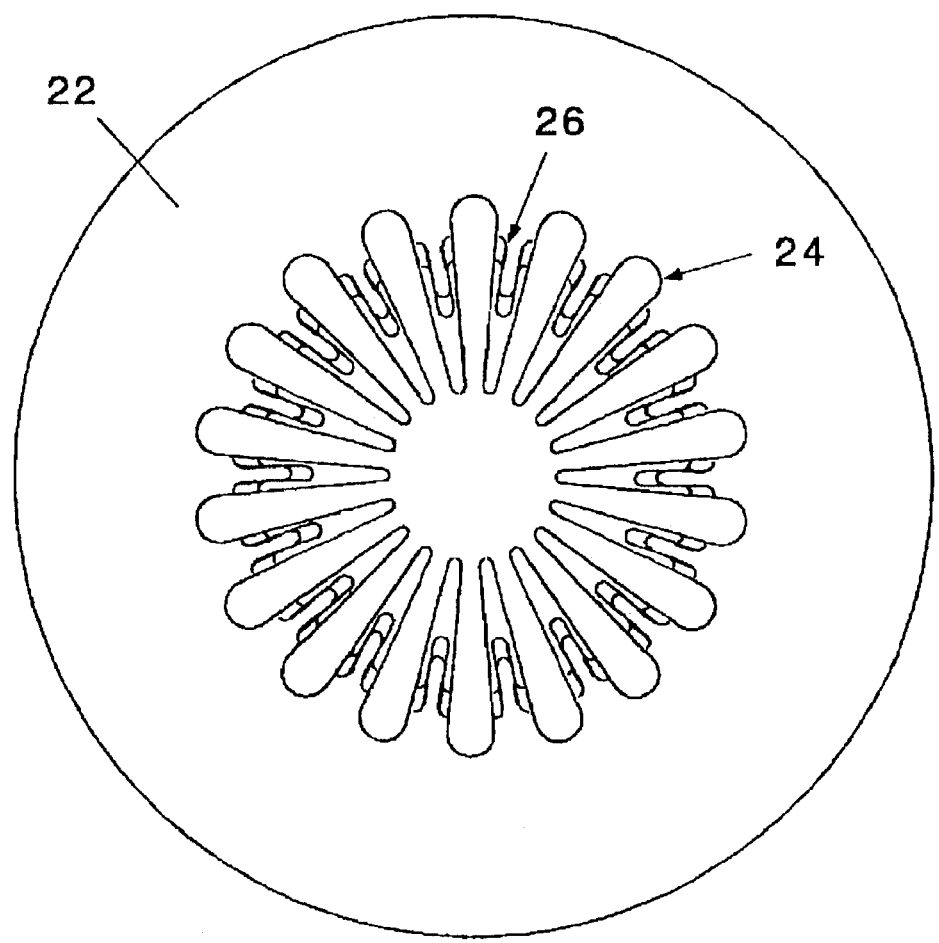
FIG. 6A illustrates a first embodiment of the invention and is a VIA—VIA arrow view of FIG. 4.
Figure 6B:
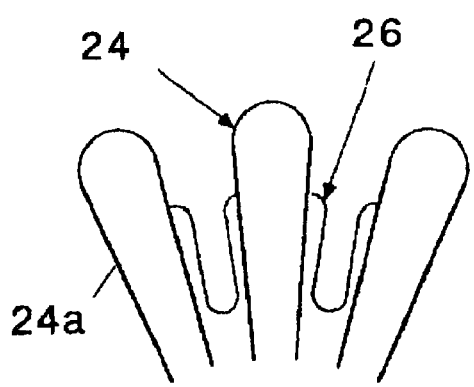
FIG. 6B is a VIB—VIB sectional view of FIG. 5 corresponding to the first embodiment of the invention.

Moreover, FIG. 6A is a VIA—VIA arrow view of FIG. 4, and FIG. 6B is a VIB—VIB sectional view of FIG. 5.

As shown in FIGS. 5, 6A, and 6B, the connecting reinforcement member 26 is disposed between lobe side walls 24a, which extend in a radial direction of the lobe portion 24 to connect the adjacent lobe side walls 24a to each other. This connecting reinforcement member 26 is a thin member disposed along the flow line 21 of fluid of low-speed inner flow 18, which flows between the lobe side walls 24a, so that the high-speed inner flow 17 flowing through the lobe portion 24 is not disturbed.

Furthermore, in this example, the member is a semi-cylindrical member 26d as shown in FIG. 6D, or U-shaped sectional member 26a shown in FIG. 6B, which has flexibility in a peripheral direction and whose opposite ends are fixed to the outer surfaces of the lobe side walls 24a disposed adjacent to each other without disturbing the flow line, so that natural vibration frequency of the lobe portion is increased so as to avoid vibration.

Additionally, in this example, an open side of the semi-cylindrical or U shape is directed outwards, but may be directed inwards as long as the flow is not disturbed. Moreover, as in this example, the connecting reinforcement member 26 is preferably disposed on the outer surface of the lobe side wall 24a, but may also be disposed on the inner surface of the lobe side wall 24a or on both the outer and inner surfaces.

[Embodiment]

Figure 6C:
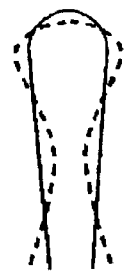
FIG. 6C is a diagram schematically showing a prior-art deformation mode.

FIG. 6C schematically shows a deformation mode of a prior-art lobe side wall at a vibration time. Moreover, FIG. 7A is a prior-art stress distribution diagram, and FIG. 7B is a stress distribution diagram of the present invention.

Figure 7A:
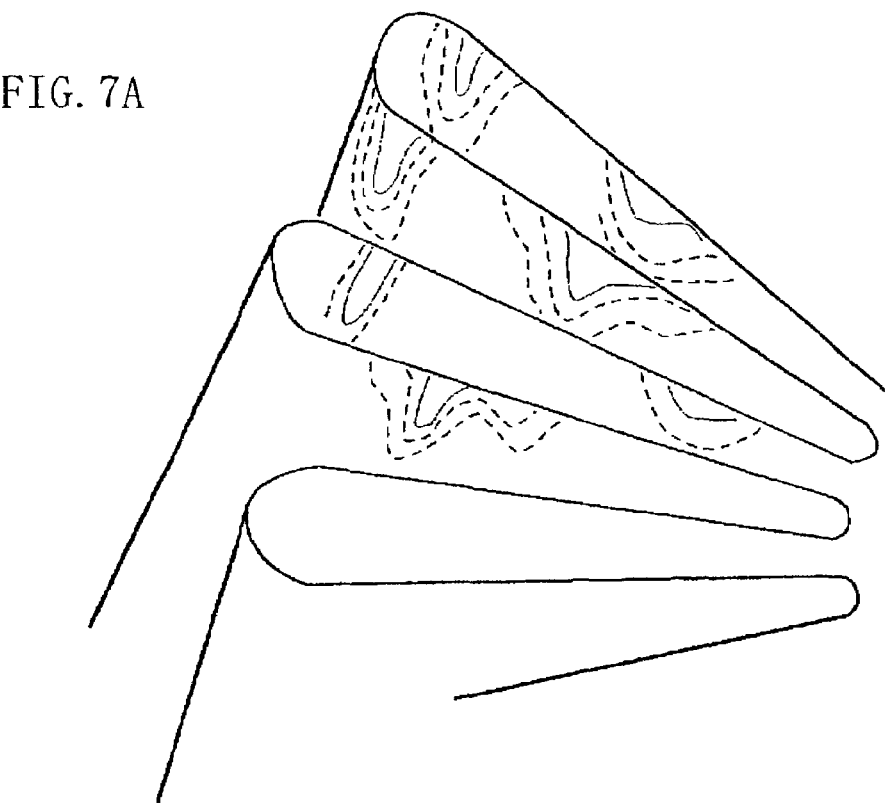
FIG. 7A is a prior-art stress distribution diagram.

A curve of FIG. 7A shows an equal stress distribution by simulation. As seen from this drawing, in a prior-art lobe mixer, a high stress was locally generated in the lobe side wall, and this lobe side wall was deformed as shown in FIG. 6C. Therefore, in the prior-art lobe mixer, there was a possibility that cracks were generated in the lobe mixer in a worst case.

Figure 7B:
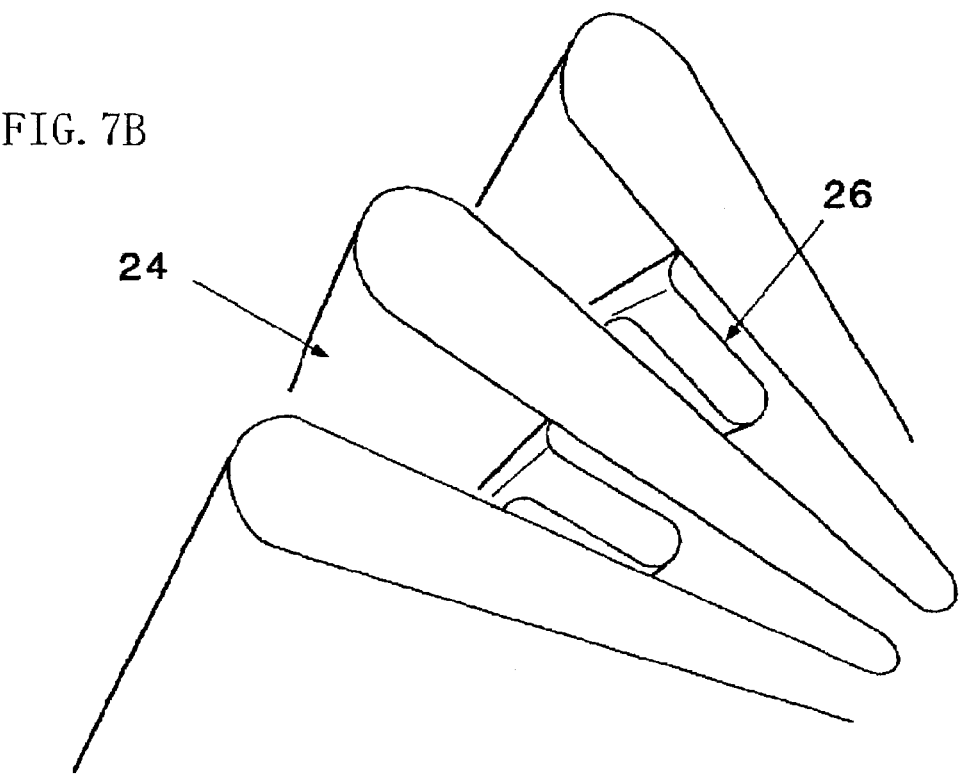
FIG. 7B is a stress distribution diagram of the present invention.

On the other hand, as shown in FIG. 7B, the local high stress was not generated by the simulation in the lobe mixer of the present invention including the connecting reinforcement member 26.

Figure 8A:
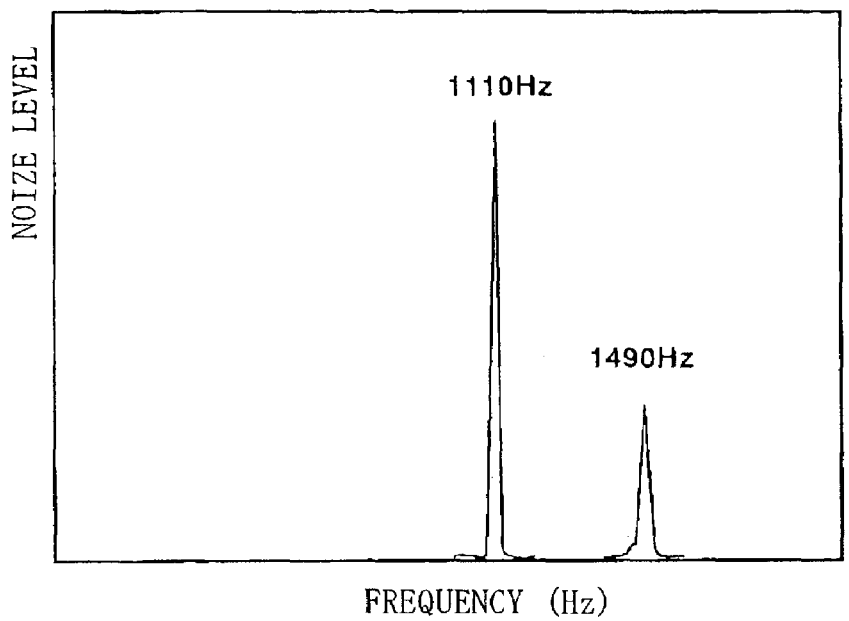
FIGS. 8A and 8B are prior-art vibration characteristic diagrams.
Figure 8B:
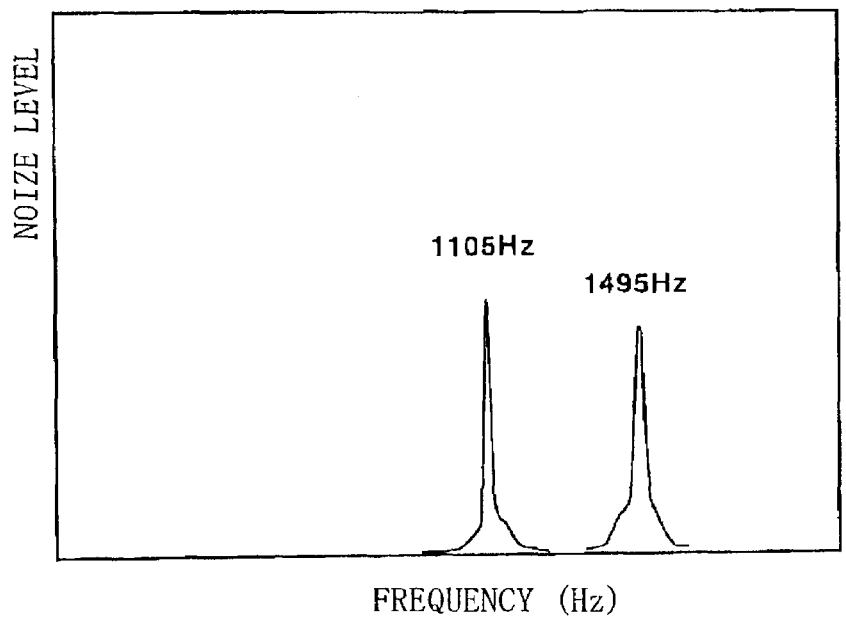

FIGS. 8A and 8B are prior-art vibration characteristic diagrams, FIG. 8A shows a vibration characteristic of a top portion of the lobe side wall, and FIG. 8B shows the vibration characteristic of a middle portion of the lobe side wall. In the respective drawings, the abscissa indicates a vibration frequency (Hz), and the ordinate indicates a noise level. It is to be noted that the drawing shows a result of test for adjusting a pressure ratio and temperature of the core flow 17a and bypass flow 17b in accordance with actual use conditions in the apparatus of FIG. 4.

It is seen from FIGS. 8A and 8B that in the prior-art lobe mixer there are resonance points in about 1100 Hz and about 1490 Hz and high vibration is generated in the resonance point.

It is to be noted that in the lobe mixer of the present invention no resonance is confirmed in the same conditions.

As described above, according to the constitution of the present invention, the high-speed inner flow and low-speed outer flow are efficiently mixed and noise reduction can be achieved by the cylindrical partition wall 22 and lobe portion 24 in the same manner as in the prior-art lobe mixer.

Moreover, since the connecting reinforcement member 26 for connecting the adjacent lobe side walls is disposed, the lobe side wall is inhibited from being deformed by the pressure difference between the inner and outer surfaces, the vibration mode involving high stress and displacement is prevented from being generated, and long life can be realized.

Furthermore, the connecting reinforcement member 26 is a thin member disposed along the flow line of the fluid which flows between the lobe side walls. Therefore, the flow flowing through the lobe portion 24 is not disturbed, the generation of the whistling sound which raises a problem in the noise reduction is prevented, and the original function can normally be fulfilled.

Additionally, the connecting reinforcement member 26 is a semi-cylindrical member or U-shaped sectional member whose opposite ends are fixed to the outer surfaces of the adjacent lobe side walls. Therefore, the member has flexibility in the peripheral direction, and the natural vibration frequency of the lobe portion can be increased to avoid the vibration without disturbing the flow line.

As described above, the lobe mixer for jet flow according to the present invention has superior effects that the high-speed inner flow and low-speed outer flow are efficiently mixed, the vibration involving high stress and displacement is not easily generated, and both the long life and noise reduction can be established.

It is to be noted that some preferred embodiments of the present invention have been described, but it could be understood that a rights scope included in the present invention is not limited to these embodiments. Contrarily the rights scope of the present invention include all improvements, modifications, and equivalents included in the attached claims.

What is claimed is:

1. A lobe mixer for jet flow, comprising:
   a cylindrical partition wall which partitions a high-speed inner flow from a low-speed outer flow, wherein the cylindrical partition wall is aligned along an axial line;
   a lobe portion disposed on a downstream side of the partition wall and along the axial line, wherein a transverse sectional shape of the lobe portion is a waveform shape, and the waveform shape is enlarged on a downstream side of the lobe portion, and the lobe portion includes lobe side walls extending in a radial direction from the axial line; and
   a connecting reinforcement member disposed between lobe side walls to connect the adjacent lobe side walls to each other, wherein the connecting reinforcement member is a thin member disposed along a flow line of a fluid of the low-speed outer flow flowing between the lobe side walls so that the high-speed inner flow flowing through the lobe portion is not disturbed, and wherein the connecting reinforcement mernher has flexibility in a peripheral direction.

2. A lobe mixer for jet flow, comprising:
   a cylindrical partition wall partitioning a high-speed inner flow from a low-speed outer flow, wherein the cylindrical partitioning wall is aligned along an axial line;
   a lobe portion disposed on a downstream side of the cylindrical partition wall and along the axial line, wherein a transverse sectional shape of the lobe portion is a waveform shape, and the waveform shape is enlarged on a downstream side of the lobe portion, and the lobe portion includes lobe side walls extending in a radial direction from the axial line; and
   a connecting reinforcement member disposed between lobe side walls so as to connect adjacent lobe side walls, wherein the connecting reinforcement member is a semi-cylindrical member, or a U-shaped sectional member, with opposite ends fixed to outer surfaces of adjacent lobe side walls, and wherein the connecting reinforcement member has flexibility in a peripheral direction.

3. A lobe mixer for jet flow according to claim 2, wherein the connecting reinforcement member is disposed along a flow line of a fluid of the low-speed outer flow flowing between the lobe side walls.

* * * * *